United States Patent [19]

Knowlton

[11] Patent Number: 4,777,541

[45] Date of Patent: Oct. 11, 1988

[54] FM VIDEO DEMODULATOR WITH FLUTTER CORRECTION

[75] Inventor: James R. Knowlton, Encinitas, Calif.

[73] Assignee: Eastman Kodak Company, Rochester, N.Y.

[21] Appl. No.: 897,889

[22] Filed: Aug. 19, 1986

[51] Int. Cl.$^4$ ............................................. H04N 5/95
[52] U.S. Cl. .................................... 360/36.1; 360/27; 358/337
[58] Field of Search ...................... 360/36.1, 33.1, 27, 360/30, 28; 358/335, 337, 338, 320, 321

[56] References Cited

U.S. PATENT DOCUMENTS

| 2,975,240 | 3/1961 | Berry | 179/100.2 |
| 3,347,997 | 10/1967 | Woodruff | 179/100.2 |
| 3,767,849 | 10/1973 | Wessels | 178/6.6 C |
| 4,218,713 | 8/1980 | Horak et al. | 360/36 |
| 4,385,327 | 5/1983 | Pate | 360/27 |
| 4,542,424 | 9/1985 | Ishihara | 360/73 |
| 4,680,651 | 7/1987 | Blessinger | 360/38.1 |

Primary Examiner—Alan Faber
Attorney, Agent, or Firm—William F. Noval

[57] ABSTRACT

Video reproduction apparatus in which image degradation which may result from flutter components of an FM video signal reproduced from magnetic tape are eliminated by means of a flutter correction signal applied to a period FM demodulator. The corrected demodulated analog video signal produces an accurate display of the original image. A scene represented by an FM video signal is recorded in a plurality of longitudinal tracks on magnetic tape along with a timing signal recorded in a timing track parallel to the video tracks. Any flutter in the video signals reproduced from the video tracks is also present in the timing signal reproduced simultaneously from the timing track. A flutter correction signal is derived from the timing signal and applied to a plurality of FM demodulators to cancel the flutter error in the demodulated video signals.

3 Claims, 5 Drawing Sheets

FM VIDEO DEMODULATOR WITH FLUTTER CORRECTION

SUMMARY OF THE INVENTION

This invention relates to video reproduction apparatus for reproducing video signals from magnetic tape and more particularly, to a flutter correction technique for cancelling flutter components in reproduced video signals.

One technique for recording video information representing a scene on magnetic tape is to record the information in a plurality of parallel tracks which run longitudinally of the tape in the direction of tape movement. Multi-track tape reproduction devices have been especially useful in the motion analysis of fast moving phenomena in slow-motion. Such a reproduction device is disclosed in commonly-assigned U.S. Pat. No. 4,496,995 issued Jan. 29, 1985. As disclosed in this patent, the motion analyzer entails the recording of a large number of images during an event at high tape speed and high frame rate, and then playing back the images more slowly at a lower frame rate and lower tape speed to analyze the movement which has occurred in step-by-step progression. Applications for such a motion analysis system include malfunctions in high speed machinery, movements of an athlete, testing of safety equipment, shattering of an object, etc. As disclosed in the latter patent, the motion analyzer includes a video imager (camera, a variable speed magnetic tape processor, and a video display monitor. The imager is read out in block format so that a plurality of lines of video information that correspond to rows of photosites in the imager are simultaneously recorded on magnetic tape in longitudinal parallel tracks. In order to play back the video signals recorded in the plurality of parallel tracks and to convert the parallel signals into a sequential signal which may be used with video monitors, a timing signal is recorded in a timing track parallel to the video information tracks simultaneously with the recording of the video information.

Ideally, to effectively reproduce the timing signals and video signals from the tape, the tape is moved past the reproducing head at a constant speed over the length of the recorded video signal. In reality, such ideal conditions are difficult to achieve and timing errors which may result in severely degraded or totally incomprehensible video displayed information may occur. Thus, variations in the speed of the tape moving past the reproducing heads may be caused by localized tape stretch, tape vibration, and/or fluctuations and imperfections in the tape transport mechanism. This timing error, called "flutter"occurs simultaneously in both the video information and in the timing signal reproduced from the tape. Thus, a flutter signal derived from the timing signal may be used to modify the video information signal to eliminate flutter components therein.

It has been proposed, such as in U.S. Pat. Nos. 3,347,997 and 4,385,327, to use a flutter signal derived from a pilot or reference signal recorded on magnetic tape to compensate for flutter in an information signal by controlling voltage controlled delays. Such a system has several has several disavantages. In a multi-track reproduction system, separate processing circuits are provided for each signal reproduced from a track on the magnetic tape. Thus, a plurality of delay lines would need to be used equal in number to the number of tracks which constitute the signal. This adds unnecessary expense and complexity to the reproduction processing circuitry. Moreover, delay lines tend to delay different frequencies by different amounts thereby introducing phase distortion into the delayed signal.

Another technique for flutter compensation (such as disclosed in U.S. Pat. No. 4,542,424) utilizes a flutter error signal derived from a pilot signal recorded on the tape to control a servo circuit which transports the magnetic tape past the reproduction head. This system is disadvantageous due to a delay in compensating for the flutter caused by inertia in the transport system. Thus, correction of the video signal as it is reproduced from the tape is not easily effected without expensive tape transport systems.

In commonly-assigned U.S. Pat. No. 4,218,713 there is disclosed apparatus for correcting time base errors in a multi-channel sampled analog video signal. This apparatus includes means for clocking the signal portions carried by respective channels into respective de-flutter buffers by clock signals derived from horizontal sync information appearing in the respective channels. Although this disclosed apparatus may be useful for the purpose for which it was intended, the necessity of using individual de-flutter buffers in each video channel increases the cost and complexity of the flutter-compensation technique disclosed therein. A flutter compensation technique relevant to the present invention is disclosed in U.S. Pat. No. 2,975,240 wherein a multi-track magnetic playback system is provided with a plurality of FM demodulators and with a plurality of flutter detection circuits in each playback channel to effect flutter correction in each channel. This technique is disadvantageous in requiring flutter detection circuitry in each channel, thereby increasing the cost and complexity of the playback circuitry.

SUMMARY OF THE INVENTION

According to the present invention, there is provided a flutter correction technique for a multi-track magnetic tape reproduction apparatus which obviates the disadvantages of the aforementioned techniques. The flutter correction technique of the present invention, is used in a multi-track magnetic tape reproducing apparatus in which a video signal representing a scene is recorded in a plurality of longitudinal tracks on magnetic tape along with a timing signal recorded in a timing track which runs parallel to the video information tracks. According to an aspect of the present invention, a flutter correction signal derived from a timing signal reproduced from the timing track is applied to a plurality of FM demodulation circuits to cancel flutter in demodulated FM video signals reproduced from the video tracks. According to a preferred embodiment of the invention, each FM demodulation circuit includes an integrator circuit, in which the gain of the integrator ramp signal and the duration of a reset period are changed by the flutter correction signal to cancel errors in the demodulated FM video signals. Thus, accurate reproduction of the original scene is effected.

BRIEF DESCRIPTION OF THE DRAWINGS

The invention will be described in detail with reference to the drawings in which like elements are provided with like numbers.

DESCRIPTION OF THE PREFERRED EMBODIMENT

In the following description, the preferred embodiment according to the present invention will be described as included in a motion analyzer which utilizes multi-track longitudinal recording of video signals and a timing signal. It will be understood, however, that the present invention may be used in other applications where timing signals are recorded along with data on recording media other than magnetic tape, such as magnetic or optical discs.

The application in which the embodiment of the present invention will be described relates to a motion analyzer which records scene information at a high frame rate and reproduces such information at a slower frame rate, thereby allowing slow motion analysis of a changing event, such as a moving object. The imager frame rate used for recording is variable between 30 and 1,000 frames per second depending upon the desired speed reduction while the display frame rate is constant at 30 frames per second. To effect this, the image frames are recorded at a high tape speed and reproduced at a low tape speed.

Figure 1:
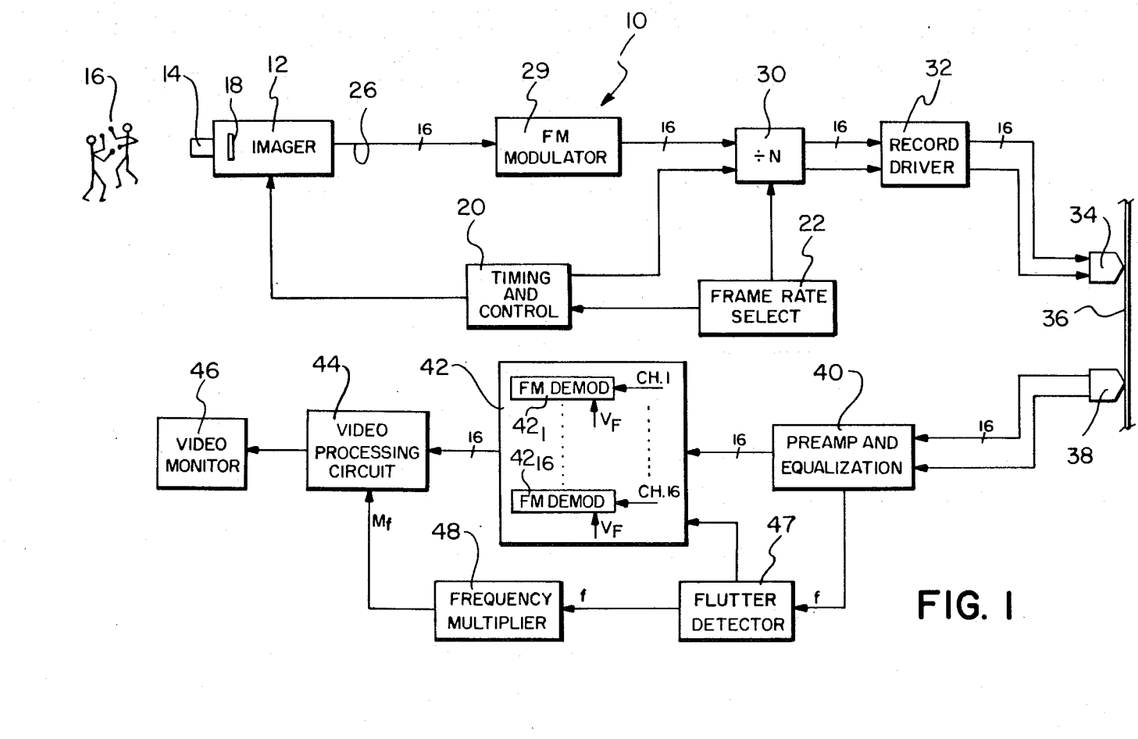
FIG. 1 is a block diagram of multi-track video reproduction apparatus including the flutter correction circuit of the present invention.

Referring to FIG. 1, there is shown a motion analyzer including an embodiment of the present invention. Such a motion analyzer is described in greater detail in commonly-assigned U.S. Pat. No. 4,496,995 and copending U.S. patent application Ser. No. 875,822, filed June 18, 1986 entitled SYNCHRONOUS FM DIGITAL DATA PROCESSOR, which are incorporated by reference. Briefly, the motion analyzer 10 includes an imager 12 having a lens 14 which images a scene 16 onto a sensor 18. Imager 12 is controlled by timing and control circuit 20 which supplies suitable timing signals to imager 12 as a function of the operator selectable frame rate and speed reduction entered into selector 22. Motion analyzer 10 may be operated at frame rates of 30, 60, 125, 250, 500, and 1000 frames per second for recording and at a frame rate of 30 frames per second for reproducing. In such case, the operator would select the appropriate frame rate by select circuit 22.

Figures 2, 3:
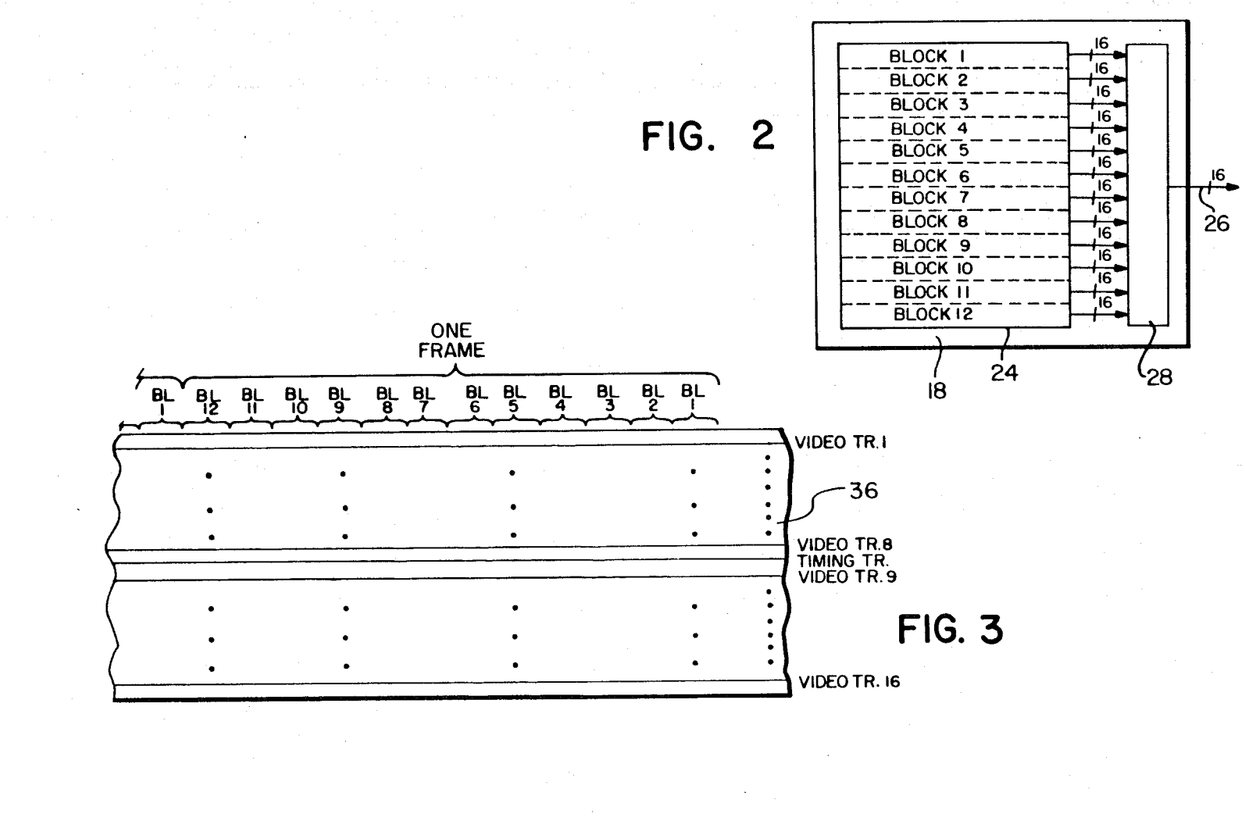
FIG. 2 is a functional block schematic diagram of a block readable imager.
FIG. 3 shows the format of video signals and timing signal recorded on tracks longitudinally on magnetic tape.

Sensor 18 is a "block" readable area image sensor. The basic concept of a block readout of a solid state area image sensor is disclosed in U.S. Pat. No. 4,322,752 in the name of James A. Bixby and in U.S. Pat. Nos. 4,322,638 in the name of T. H. Lee et al and 4,330,796 in the names of C. N. Anagnostopoulos et al. Although the referenced patents provide detailed information, a brief description of the concept of block readout may be illustrated with respect to FIGS. 2 and 3. FIG. 2 shows a block readable sensor 18 that includes an array of photosites (not shown individually) arranged in rows and columns (e.g. 192 rows and 240 columns). For purposes of readout, sensor 18 is formatted into 12 blocks of 16 photosite rows each. Although demarcation between blocks is indicated by dashed lines, it will be understood that no physical demarcation on the sensor itself is necessary. Through appropriate control circuitry, blocks 1-12 are sequentially read out of image area 24 of imager sensor 18 and applied to an output line 26 by means of block multiplexer 28. As a result of such readout, block information is produced in series and each block of information contains 16 row signals arranged in parallel.

Referring again to FIG. 1, each of the 16 signals that constitutes the analog video signal from imager 12 is frequency modulated as square waves in FM modulator 28 on a carrier having a black level frequency of 4.166 MHz and a white level frequency of 6.66 MHz. All 16 frequency modulated video signals are applied to a divide by N circuit 30 in which each frequency signal is divided by a Factor of N. The value of "N" is equal (to the nearest integer) to the ratio of the maximum record frame rate to the selected record frame rate. Thus if the maximum frame rate is 1000 frames per second, and the selected record frame rate is 125 frames per second, then N would be equal to 8.

A timing signal from circuit 20 is also applied to circuit 30.

The 16 parallel FM video signals and a timing signal are applied to record driver circuit 32 which drives record head 34 to record the video signals in 16 parallel longitudinal tracks on tape 36. The timing signal is recorded simultaneously in a timing track which runs parallel to the video tracks. This is shown more clearly in FIG. 3 where the 16 row signals are recorded in video tracks 1-16 and the timing signal is recorded in a timing track which runs parallel to the video tracks between video track 8 and video track 9. As shown, the signals from each block are recorded sequentially on tape 36 so that a frame of information is recorded in the recording of the 16 lines of sequential blocks 1-12.

Referring again to FIG. 1, during reproduction, tape 36 is moved past reproduce head 38 at a constant speed irrespective of the tape speed at which the data was recorded on the tape. Reproduce head 38 (as well as record head 34) has a plurality of heads equal in number to the number of tracks of video information and the timing signal track on tape 36. Thus, head 38 would have 17 closely spaced heads, 16 heads for reproducing square wave FM video signals from video tracks 1-16 and a head for reproducing the timing signal from the timing track. Although, ideally, tape 36 is moved past head 38 at a constant velocity, in reality, the tape experiences variations in its speed caused by localized tape stretch, tape vibration and/or vibrations in the speed of the tape transport mechanism. These variations in tape speed during reproduction result in timing error signals in the reproduced video information which cause severely degraded or totally incomprehensible information displayed on a video monitor. If such degraded information appears at a critical time in a sequence of video frames during a motion analysis test, the test may be negated causing unnecessary waste of equipment, money and personnel time.

The 16 channels of FM video signals and the timing signal are applied to circuit 40 which preamplifies and equalizes the signals according to known techniques. The 16 channels of FM video signals are applied to FM demodulation circuit 42 which comprises 16 FM demodulators ($42_1$–$42_{16}$) for individually demodulating each FM video signal into an analog video signal. The timing signal is applied to a timing signal processing circuit which may for example, take the form of the timing signal processing circuit described in copending commonly-assigned U.S. patent application Ser. No. 897,840, filed Aug. 19, 1986 entitled TIMING SIGNAL DROPOUT COMPENSATION, now U.S. Pat. No. 4,680,651. Briefly, such circuit includes flutter detector circuit 47 which produces a flutter control signal $V_f$ which is applied to FM demodulators $42_1$–$42_{16}$. The timing signal is multiplied in frequency multiplier circuit 48 to produce a signal $M_f$ which is applied to video processing circuit 44. After demodulation, the 16 channels of analog video signals are applied to video processing circuit 44 along with appropriate timing signals to produce an NTSC video signal which is applied to video monitor 46 to reproduce the original scene. An exemplary form of video processing circuit 44 is described in the aforementioned copending U.S. patent application Ser. No. 897,890, filed Aug. 19, 1986 and in U.S. Pat. No. 4,496,995 (FIG. 9).

Figure 4:
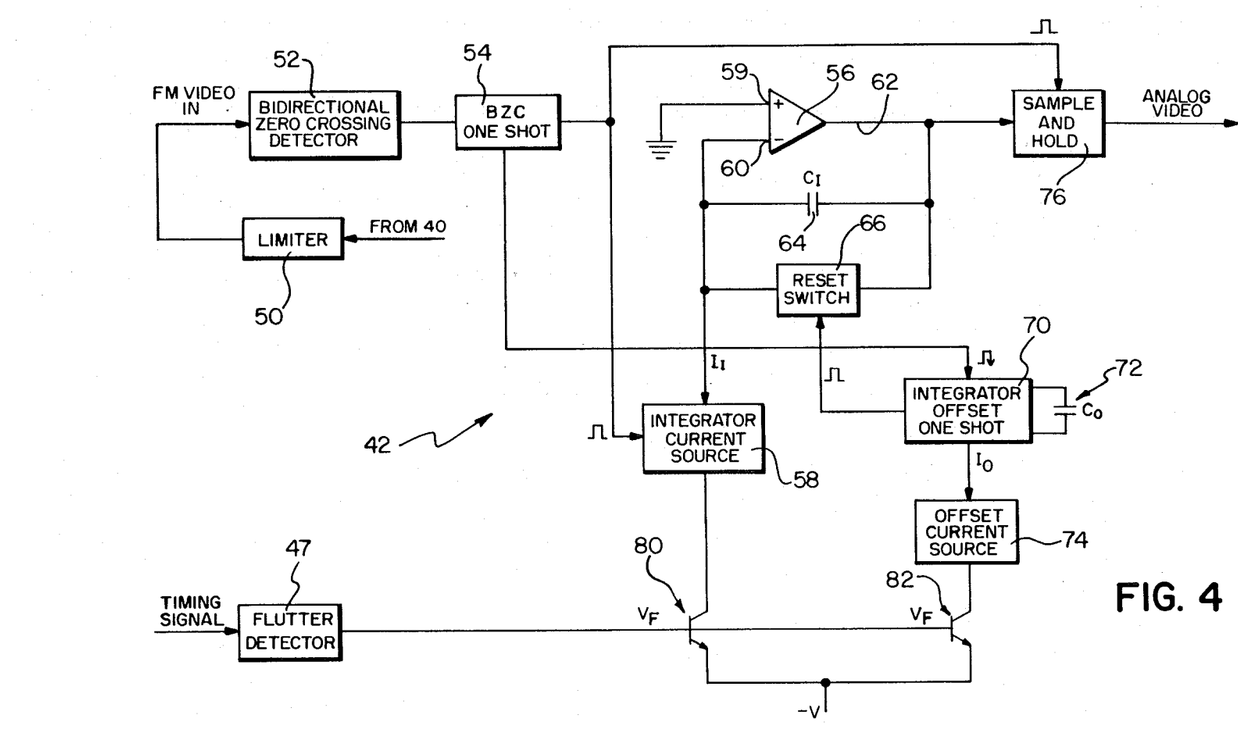
FIG. 4 is a block diagram showing an FM demodulator including flutter correction as used in the apparatus of FIG. 1.

Referring now to FIG. 4, there will be described a preferred embodiment of an FM demodulator having flutter correction according to the present invention. The circuit shown in FIG. 4 is duplicated sixteen times in FM demodulation circuit 42 so that 16 channels of FM video signals from equalization circuit 40 are demodulated simultaneously to produce 16 analog video signals.

If a properly reproduced frequency modulated video signal is demodulated, the recovered analog video signal will have a signal value which accurately reflects the intensity level of the original image. However, if the frequency modulated signal is itself frequency modulated due to tape flutter during reproduction of the signal from tape, then the additional shifts in frequency will obscure the original modulating frequency and produce a false analog signal level which will obscure the original image. The FM demodulator circuit of FIG. 4 is basically a period demodulation system in which the times between zero crossings of the FM video signal are representative of the original analog video signal before frequency modulation. Tape flutter will cause the tape to momentarily speed up or slow down so that zero crossings are either too early or too late. Thus, in order to correct for the incorrect zero crossings, the recovered video signal must be compensated to eliminate the effect of flutter error.

Since the simultaneously reproduced video signals and timing signal contain the same flutter error component, according to the present invention, flutter error is corrected by developing a flutter correction signal from the timing signal and by applying the correction signal to the FM demodulators to cancel flutter error components from the demodulated video signals. According to an aspect of the invention, a single flutter compensation signal is derived from the reproduced timing signal to effect flutter correction in each of the FM demodulators. This simplifies the flutter error correction circuitry so that an individual flutter detection circuit for each FM demodulator is unnecessary.

Figure 5A:
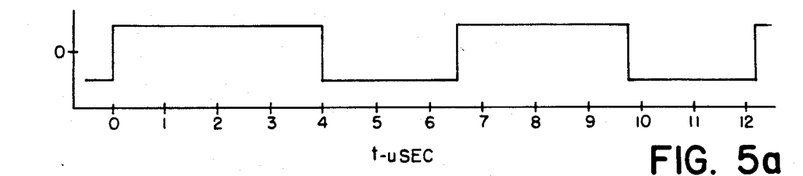
FIGS. 5a-5e are waveform diagrams illustrating the operation of the FM demodulator of FIG. 4.

Referring again to FIG. 4, the square wave FM video signal from circuit 40 is limited by limiter 50 and is then applied to bi-directional zero crossing detector 52. At each zero crossing of the FM signal (FIG. 5a), detector 52 produces an output signal which is applied to a one-shot multivibrator 54 (BZC one-shot) to produce a series of sample pulses having a period $T_S$ (see FIG. 5c).

Figure 6A:
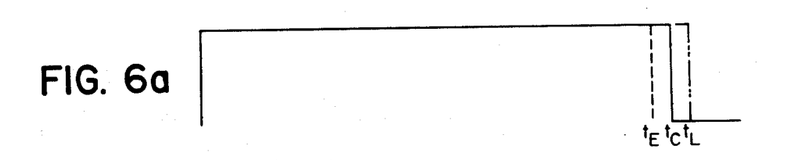
FIGS. 6a and 6b are is a waveform diagram illustrating the flutter correction technique of the present invention.
Figure 6B:
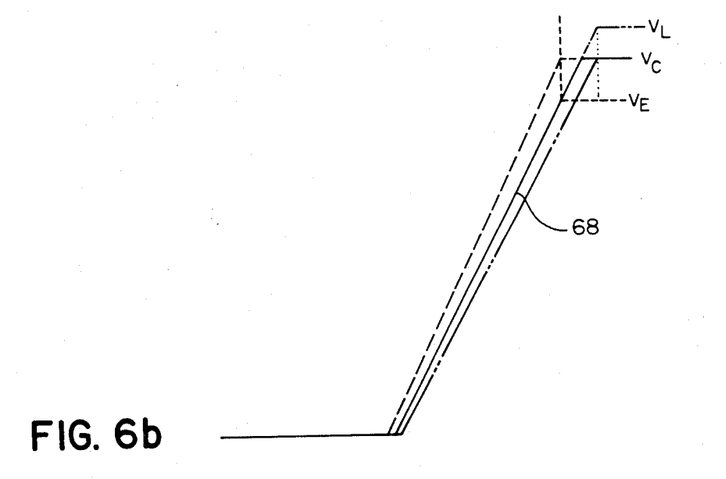

An integrator circuit includes an operational amplifier 56 having its positive input 59 connected to ground and its negative input 60 connected to an integrator current source 58 of known construction (such as a current mirror or the like). Connected between the negative input 60 of output 62 and op-amp 56 are an integrating capacitor 64 of capacitance $C_I$ and reset switch 66. Integrator current source 58 provides a constant current $I_I$ to the negative input of op-amp 56. During the integration period, integrator capacitor 64 charges at an integration rate or slope $I_I/C_I$, (which is illustrated in FIG. 6b as ramp curve 68).

Reset switch 66 is controlled by reset pulses (FIG. 5d) from integrator offset one-shot 70 which produces a reset pulse having a period determined by the value $C_O$ of one-shot timing capacitor 72 which has a timing period $T_O$ determined by offset current $I_O$ provided by offset current source 74.

The output 62 is sampled by sample and hold circuit 76 whose output is an analog video signal.

If there is no flutter present in the reproduced FM video signal, demodulation thereof is effected by the circuit of FIG. 4 as follows. Assume that it has been some time since a zero crossing of the FM video signal and integrating capacitor 64 is charging up by means of current $I_I$ supplied by integrator current source 58. At the next zero crossing at a time $t_0$ (FIG. 5a), detector 52 produces a trigger signal which actuates one-shot multivibrator 54 to produce a sample pulse which is applied to sample and hold circuit 76 and to integrator current source 58. The sample pulse (FIG. 5c) is of a duration $T_S$ and causes current source 58 to be turned off so that integration current to integrating capacitor 64 is terminated. For the period $T_S$, the output voltage on capacitor 64 is held and is sampled and stored by sample and hold circuit 76. This voltage will vary as a function of the time between zero crossings of the FM signal and thus is representative of the original analog video signal before frequency modulation and recording on tape 36.

Figure 5B:
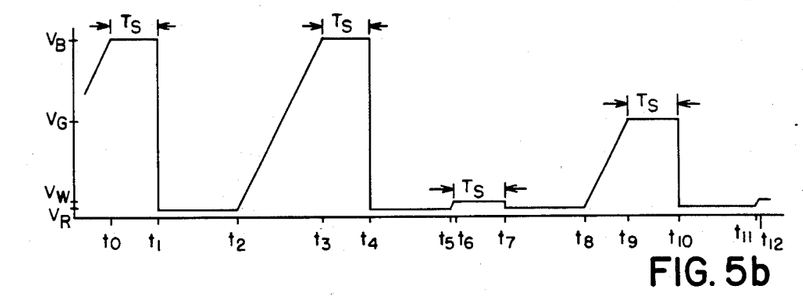
Figure 5C:
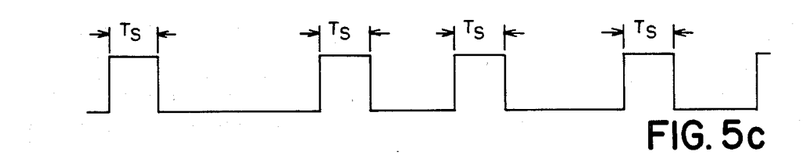
Figure 5D:
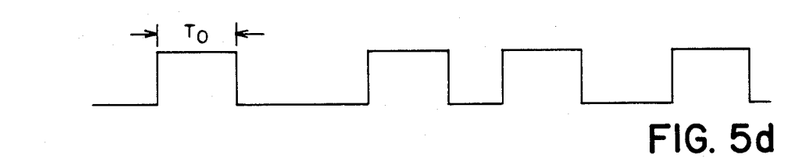
Figure 5E:
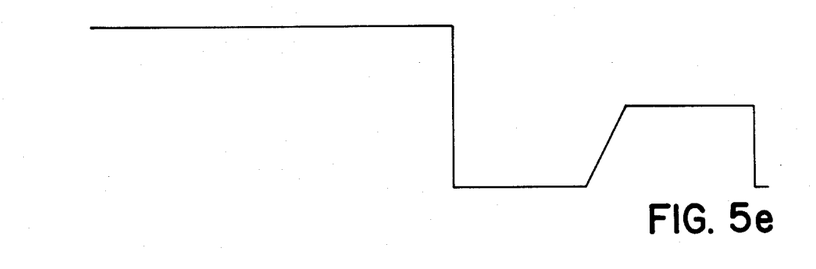

As shown in FIG. 5b, the value of the integrator output voltage at time $t_0$ is $V_B$ which is sampled by sample and hold circuit 76 and presented at the output thereof (see FIG. 5e).

At time $t_1$, at the end of the sample pulse period $T_S$, the falling edge of a reset pulse (produced by one-shot multivibrator 54 simultaneously with the sample pulse) causes integrator offset one-shot multivibrator 70 to produce a reset pulse (FIG. 5d) having a duration $T_0$ which is a function of the offset current $I_0$ supplied by offset current source 74 and applied to offset one-shot multivibrator timing capacitor 72 having a capacitance $C_0$.

The reset switch 66 is turned on during the reset period and discharges integrating capacitor 64. At this time also, the sampled pulse has terminated and integration current source 58 is turned on, but since reset switch 66 is held on by a reset pulse from one-shot multivibrator 70, no integration of capacitor 64 takes place. During the reset period $T_0$, output 62 of the integrator is held at reset voltage $V_R$ (see FIG. 5b) which is below the limit of the video signal demodulation range.

The sum of the sample period $T_S$ and the offset period $T_0$ is made equal to slightly less than the half period of the highest FM frequency, nominally 2.4 μsec for the 210 KHz signal used for the white limit of the video signal.

At the end of the offset period at time $t_2$ (FIGS. 5b, 5d), the reset pulse returns to zero and reset switch 66 is turned off, allowing integration current supplied by current source 58 to charge integrating capacitor 64. Capacitor 64 continues to integrate until a subsequent zero crossing of the FM video signal is detected by detector 52. As shown in FIGS. 5a and 5b the first half wave of the FM signal extends from time $t_0$ to time $t_3$ (4 μsec) and is a half-wave of the lowest FM frequency signal, i.e. 125 KHz which is representative of a black image pixel. At time $t_3$, BZC one-shot multi-vibrator 54 produces a sample pulse of duration $T_S$ (FIG. 5c) which shuts off the integration current source 58 and terminates charging of integrating capacitor 64. From time $t_3$ to $t_4$, the voltage at output 62 is sampled by sample and hold circuit 76. At time $t_4$, the falling edge of the sample pulse triggers offset one-shot 70 to produce a reset pulse which closes reset switch 66. Capacitor 64 is discharged and the output 62 of the integrator is held at a voltage $V_R$ during the reset period. At time $t_5$, the reset switch 66 is turned off by the termination of the reset pulse and capacitor 64 begins to charge. However, a zero crossing of the FM video signal at time $t_6$ (FIG. 5a) stops integration at the $V_W$ (white) signal level and the sample and hold circuit 76 samples the voltage and applies it as an output analog video signal. The FM video waveform (FIG. 5a) from time $t_3$ to time $t_6$ between zero crossings is representative of the highest FM modulation video signal having a frequency of 210 KHz and is representative of the white signal limit of the analog video signal.

Subsequent zero crossings of the FM video signal (FIG. 5a) at time $t_9$ and $t_{12}$ produce the output waveform of FIG. 5b at output terminal 62 of the integrator and the demodulated analog video signal of FIG. 5e at the output of sample and hold circuit 76. It will be appreciated that the analog video signal of FIG. 5e is inverted so that the highest signal value represents a black image and the lowest signal value represents a white image.

According to the present invention, there is provided a technique for cancelling any flutter error which may be introduced into the FM video signal reproduced from magnetic tape 36. Since the FM video signals and the timing signal are recorded on magnetic tape 36 simultaneously, and also reproduced from magnetic tape 36 simultaneously, any flutter error which is introduced into the video signal upon reproduction will also be present in the simultaneously reproduced timing signal. Thus, the flutter error in the timing signal is effectively the same as the flutter error in the video signals particularly since the timing signal is recorded in a track running down the middle of the tape. According to the present invention, the timing signal from the timing track is applied to a flutter detector circuit 78 which may, for example, take the form of the similar circuit disclosed in copending U.S. application Ser. No. 897,890 filed Aug. 19, 1986, entitled TIMING SIGNAL DROPOUT COMPENSATION. As disclosed therein, a phase lock loop continuously tracks the timing signal reproduced from the tape and detects any shift in the frequency of the timing signal produced by flutter. The flutter correction signal $V_f$ is applied to the bases of transistors 80 and 82 which respectively change the integration and offset currents $I_I$ and $I_O$ supplied to integration capacitor 64 and offset capacitor 72. If the flutter is such as to increase the frequency of the timing signal and thus the frequencies of the FM video signals, the zero crossings will occur sooner than expected, thus, in general, causing a reduction in the reproduced analog video signal. If the flutter causes the tape to slow down so that the frequency of the FM signals and of the timing signal are decreased in frequency, then the zero crossings will occur later in time than expected, causing an increase in reproduced analog video signal. These inaccuracies in the reproduced analog video signal will obscure or severely degrade the reproduced image on the video monitor.

According to the present invention, if there is a momentary increase in tape speed so as to increase the frequencies of the FM video signal and of the timing signal, the flutter circuit will produce a correction signal $V_f$ which biases transistors 80 and 82 to increase integration current $I_I$ and offset current $I_O$, so as to increase the gain or slope of the integration ramp signal and to decrease the on time of reset switch 66. This is shown more clearly in FIGS. 6a and 6b. In FIG. 6a, the reproduced FM video signal without flutter is shown (in solid line) as having a zero crossing at time $t_c$ and the integration curve (FIG. 6b) reaches a correct value of $V_C$. If the tape should speed up so that the zero crossing of the FM video signal is sooner at a time $t_E$, integration will stop at signal level $V_E$ which is less than the correct signal level $V_C$. If on the other hand, the tape should slow down during reproduction, the zero crossing of the FM Video signal will occur later at a time $t_L$ and the demodulated video signal will have a value $V_L$ which is greater than the correct signal $V_c$.

According to the present invention, the flutter detector 78 will produce a bias voltage $V_f$ which is applied to transistors 80 and 82 to increase the integration current $I_I$ and offset current $I_O$ so as to increase the slope or gain of the integration signal and to decrease the offset time by decreasing the offset period $T_0$ of the reset pulse produced by integrator offset one-shot multivibrator 70. This is shown in FIG. 6b wherein the dashed line integration curve is shown to have a greater slope (gain) than the solid line integration curve and to start integration at an earlier time since the offset time has been decreased. Thus when the FM signal has a zero crossing at $t_E$, the integration curve has reached the correct value $V_C$ and will be sampled by sample and hold circuit 76 to produce a correct output analog video signal.

If flutter in the tape produces a late zero crossing of the FM video signal, then the flutter correction signal produced by circuit 78 causes the integration and offset currents ($I_I$ and $I_O$) to decrease so that the integration curve (shown in dotted lines in FIG. 6b) has a lesser slope (gain) and the offset period is increased. When the late zero crossing at time $t_L$ occurs, integration of integrating capacitor 64 is terminated at the correct voltage level $V_C$ so that the analog video signal has the correct value.

The flutter correction technique of the present invention is useful where each of the $F_CM$ demodulators has been calibrated either manually or automatically as disclosed in commonly-assigned co-pending U.S. patent application Ser. No. 929,574, filed Nov. 12, 1986, inventor J. Knowlton, entitled VIDEO REPRODUCTION APPARATUS HAVING AUTOMATIC BLACK AND WHITE CALIBRATION.

Although the invention has been described in detail with reference to preferred embodiments thereof, it will be understood that variations and modifications can be effected within the spirit and scope of the invention as described hereinabove and as defined in the appended claims.

What is claimed is:

1. A demodulator for FM video signals having flutter components comprising:
    means for simultaneously reproducing a frequency modulated video signal and a timing signal from magnetic tape;
    integrator means for producing a ramp signal which varies substantially linearly over a predetermined integration period between first and second signal values representing intensity limits of a scene;
    sample and hold means for sampling and holding the signal produced by said integrator means;
    zero crossing detector means for producing a pulse of fixed sampling period which terminates production of said signal by said integrator means and which causes said sample and hold means to sample said integrator signal value during said sampling period and to hold said signal value after termination of said sampling period;
    reset switch means for resetting the output signal value of said integrator means to a reset value less than said first signal value, at the termination of said sample period, and for maintaining said integrator output at said reset value for a predetermined offset period;
    means for producing a flutter correction signal which is a function of flutter in said reproduced FM video signal; and
    means for applying said flutter correction signal (1) to said integrator means to change the slope of said ramp signal and (2) to said offset switch means to change the duration of said offset period in order to cancel said flutter in said demodulated video signal.

2. The demodulator of claim 1 wherein said integrator means includes an integrating capacitor and integrator current source means for supplying an integrating current to said capacitor and wherein said flutter correction signal applying means causes a change in said integration current in order to cancel the effect of flutter in said demodulated FM video signal by increasing or decreasing the rate of charging said integration capacitor.

3. The demodulator of claim 2 including integrator offset one-shot multivibrator means for producing a reset signal which actuates said reset switch means during a reset period, said multivibrator means including a reset period timing capacitor and further including an offset current source means for supplying an offset timing current to said reset capacitor means and wherein said flutter correction signal applying means changes the offset current produced by said offset current source means as a function of the flutter signal so as to increase or decrease the duration of said reset signal period.

* * * * *